US010654127B2

(12) United States Patent
Li (10) Patent No.: US 10,654,127 B2
(45) Date of Patent: May 19, 2020

(54) ENGRAVING SYSTEM AND METHOD OF OPERATION THEREOF

(71) Applicant: Tong Li, Haslett, MI (US)

(72) Inventor: Tong Li, Haslett, MI (US)

(\*) Notice: Subject to any disclaimer, the term of this patent is extended or adjusted under 35 U.S.C. 154(b) by 393 days.

(21) Appl. No.: 15/792,425

(22) Filed: Oct. 24, 2017

(65) Prior Publication Data

US 2019/0118290 A1    Apr. 25, 2019

(51) Int. Cl.

| | | |
|---|---|---|
| *B23K 26/08* | (2014.01) | |
| *B23K 26/362* | (2014.01) | |
| *B44B 3/06* | (2006.01) | |
| *B23K 26/00* | (2014.01) | |
| *B23K 26/14* | (2014.01) | |
| *B23K 37/04* | (2006.01) | |
| *B23K 26/364* | (2014.01) | |
| *B23K 26/10* | (2006.01) | |
| *B23K 26/16* | (2006.01) | |

(Continued)

(52) U.S. Cl.
CPC ...... *B23K 26/0884* (2013.01); *B23K 26/0096* (2013.01); *B23K 26/035* (2015.10); *B23K 26/083* (2013.01); *B23K 26/0823* (2013.01); *B23K 26/0876* (2013.01); *B23K 26/10* (2013.01); *B23K 26/14* (2013.01); *B23K 26/1462* (2015.10); *B23K 26/16* (2013.01); *B23K 26/361* (2015.10); *B23K 26/362* (2013.01); *B23K 26/364* (2015.10); *B23K 37/02* (2013.01); *B23K 37/0417* (2013.01); *B44B 3/063* (2013.01)

(58) Field of Classification Search
CPC .............. B23K 26/0084; B23K 26/035; B23K 26/1462; B23K 26/361; B23K 26/364; B23K 26/0096; B23K 26/0823; B23K 26/0876; B23K 26/10; B23K 26/14; B23K 26/16; B23K 26/362; B23K 26/0884; B23K 26/0643; B23K 26/127; B23K 37/02; B23K 37/0417; B23K 37/0217; B44B 3/063; B44B 7/00; B44B 7/007

See application file for complete search history.

(56) References Cited

U.S. PATENT DOCUMENTS

4,061,305 A    12/1977 Beekenkamp
4,732,410 A    3/1988 Holbein et al.
(Continued)

*Primary Examiner* — Shawntina T Fuqua
(74) *Attorney, Agent, or Firm* — Young Basile Hanlon & MacFarlane, P.C.

(57) ABSTRACT

An engraving system using a laser as a tool includes a laser cabinet with a three-point suspension system for mounting the cabinet on a surface such as a table. The three suspension points are arranged in a triangle with at least one of the suspension points being either in the front center or rear center of the field of translation of the engraving tool in the xy plane. While the other two suspension points are mounted in either the left and right front corners of the field or the left and right rear corners of the field or close to those locations. Using the three triangularly arranged suspension points, at least two of which are independently adjustable in elevation, the laser cabinet can be elevated and oriented so as to maintain the plane of the tool translation field parallel to the target surface of the workpiece during an engraving operation. Where the tool is a laser, the cabinet also carries a gas laser tube and an optical system for directing the output thereof to a nozzle aimed downwardly along the z axis and equipped for programmable translation in the xy axis field.

13 Claims, 10 Drawing Sheets

(51) Int. Cl.
    *B23K 37/02*      (2006.01)
    *B23K 26/035*      (2014.01)
    *B23K 26/361*      (2014.01)

(56) References Cited

U.S. PATENT DOCUMENTS

| | | |
|---|---|---|
| 4,985,780 A | 1/1991 | Gamier et al. |
| 5,224,716 A | 7/1993 | Saeda et al. |
| 5,262,612 A | 11/1993 | Momany et al. |
| 5,275,098 A | 1/1994 | Larson |
| 5,341,157 A | 8/1994 | Campagna et al. |
| 5,381,591 A | 1/1995 | Ponger et al. |
| 5,554,335 A | 9/1996 | Fields et al. |
| 5,672,285 A | 9/1997 | Kondo et al. |
| 5,904,867 A | 5/1999 | Herke |
| 6,037,015 A | 3/2000 | dos Santo Simoes et al. |
| 6,064,034 A | 5/2000 | Rieck |
| 6,169,266 B1 | 1/2001 | Hughes |
| 6,388,228 B1 | 5/2002 | Lai |
| 6,423,925 B1 | 7/2002 | Sukhman et al. |
| 6,424,670 B1 | 7/2002 | Sukhman et al. |
| 6,462,303 B1 | 10/2002 | Brown |
| 6,746,724 B1 | 6/2004 | Robertson et al. |
| 6,855,911 B1 | 2/2005 | Lai |
| 6,881,924 B2 | 4/2005 | Lai |
| 7,351,783 B1 | 4/2008 | Perala et al. |
| 7,652,225 B2 | 1/2010 | Fazeny |
| 7,919,191 B2 | 4/2011 | Arnold |
| 8,309,881 B2 | 11/2012 | Li |
| 9,168,760 B2 | 10/2015 | Li |
| 2001/0031315 A1 | 10/2001 | Okamoto et al. |
| 2004/0045941 A1 | 3/2004 | Herzog et al. |
| 2005/0205537 A1 | 9/2005 | Penz et al. |
| 2006/0234061 A1 | 10/2006 | Buckel et al. |
| 2007/0035777 A1 | 2/2007 | Kintner |
| 2007/0099699 A1 | 5/2007 | Plotkin |
| 2008/0160254 A1 | 7/2008 | Arnold |
| 2009/0223944 A1 | 9/2009 | Sukhman et al. |
| 2010/0213180 A1 | 8/2010 | Miller |
| 2011/0174789 A1 | 7/2011 | Li |
| 2016/0059363 A1 | 3/2016 | Ardisson et al. |

ENGRAVING SYSTEM AND METHOD OF OPERATION THEREOF

FIELD OF THE INVENTION

This invention relates to engraving systems and more particularly to an improved suspension system for the cabinet in which the engraving tool, typically a laser, is mounted. The suspension system allows the elevation and orientation of the engraving tool working plane to be adjusted so as to remain essentially parallel to the target plane of the workpiece throughout the engraving operation.

BACKGROUND

In my U.S. Pat. No. 8,309,881, I disclose a laser engraving system comprising a support table and a laser-equipped cabinet adjustably mounted on top of the table for directing a laser beam along a z (vertical) axis which extends through an open top of the table toward a work surface. The workpiece may be mounted on or supported by any of the several different types of support carts described in the patent, or it may be placed on the floor in which case the table is omitted. The patent describes a four-point suspension system for adjustably supporting the laser cabinet on the table or on the floor. The suspension system includes manually operated screw shafts located at the four corner points on the laser cabinet. Over time, I have found that the four-point suspension is unnecessarily difficult to operate.

The prior art also includes U.S. Application No. 2007/003577 which discloses an open bottom laser engraver; U.S. Pat. No. 4,061,305 which discloses a foldable table usable as a work bench; U.S. Pat. No. 5,224,716 which discloses a workpiece rotation system for a laser machine tool; U.S. Application Publication No. 2016/0059363 which discloses a multi-axis positioning system for a laser cutter; and U.S. Application Publication No. 2004/0045941 which also discloses a workpiece support with an elevator.

SUMMARY OF THE INVENTION

My invention is an improvement to the suspension system disclosed in the '881 patent. According to my improvement invention the laser cabinet is supported at just three points at least two of which are adjustable for elevation and I have found that this allows for faster, easier and better adjustment of the laser elevation and orientation relative to the surface of the workpiece to be engraved. Through this three-point suspension, the laser is placed at the correct focal point and remains at the correct focal point at all times.

In one embodiment, all three suspension points are adjustable to determine the elevation and orientation in space of the laser working plane. Disclosed herein is a handy gauging device to facilitate the elevation adjustment process.

In another embodiment, shown in connection with a foldable table for a smaller more portable laser cabinet, only two of the suspension points are adjustable while the third point is fixed by means of a support pad or plate on the table.

In both embodiments, a cart is provided to support the workpiece and the cart includes an elevator system. In the case of the suspension system with one fixed elevation point, the cart elevator is used to set the elevation of the cabinet relative to the workpiece at the fixed point. The adjustable suspension points are then used to properly set the elevation of the laser nozzle relative to the workpiece as well as the orientation of the laser travel field relative to the workpiece.

In all illustrated embodiments, the three suspension points are preferable arranged in a triangle, while the field of laser travel is essentially rectangular; i.e. in an x-y plane. Once suspension point is preferable located in the center of either the front or rear of the laser cabinet while the other two points; i.e. the adjustable points in the second embodiment described above are located generally in the rear or front corners of the cabinet. If the fixed point is in the center front, then the two adjustable points are in the opposite rear corners and spaced apart along the x axis (the lateral axis when looking at the laser movement field).

The laser cabinet preferably has a viewing window that allows the operator to see the laser nozzle as well as its movement over the workpiece and the effect of the engraving system on the workpiece at all relevant times. An exhaust system to eliminate the accumulation of fumes may be used.

As indicated above, I disclose herein two embodiments of my invention: a larger fixed installation wherein the laser cabinet is mounted on a large heavy table structure with a rectangular opening in the top so that the laser beam can be directed through that opening onto the surface of the workpiece. The workpiece in this embodiment is supported on a more sophisticated cart having a motor driven elevation system for moving the workpiece support surface up and down along the z axis. That elevator does not, however, provide for tilting of the workpiece to change its orientation.

In the other embodiment designed for use with a smaller portable laser engraving system, the table is light weight and foldable for storage and/or transportation and preferably uses the three-point suspension system in which the center point along the x axis is at a fixed elevation. The cart in this embodiment is mounted on wheels so as to be easily move about and uses a hand-crank for elevation control purposes.

Also disclosed herein is a device by which a cylindrical or tapered cylindrical object may be engraved while being rotated about an axis of symmetry parallel to the x axis of the laser nozzle travel.

These and other objectives and benefits of my invention as disclosed herein will be apparent from reading the following specification which describes the various embodiments of my invention in detail with the understanding that modifications and additions to these embodiments may occur to persons of skilled in the art.

BRIEF DESCRIPTION OF THE DRAWINGS

The various features, advantages and other uses of the present invention will become more apparent by referring to the following detailed description and drawing in which.

DETAILED DESCRIPTION OF AN ILLUSTRATIVE EMBODIMENT

Referring to FIGS. 1, 2, 7 and 8 there is shown a laser engraving system comprising a generally rectangular base table 10 with generally flat top surface having a large center opening, the base table in all views supporting a laser engraving cabinet 12 having a hinged cover 13 with a viewing window 15 and handles 48 and 50 together with an exhaust conduit 46. Mounted within the cabinet 12 is a laser system 14 including a downwardly aimed laser engraving nozzle 16 mounted on a transverse carrier beam 54 which in turn is mounted on fore-and-aft transport system beams 52 equipped so that the laser nozzle 16 can be programmed by a control center 18 to move in a two-dimensional x-y plane wherein the x axis is defined by the beam 54, the y axis is defined by the orientation of the transport beams 52 and the z axis is the vertical or aiming axis of the nozzle 16.

Figure 7:
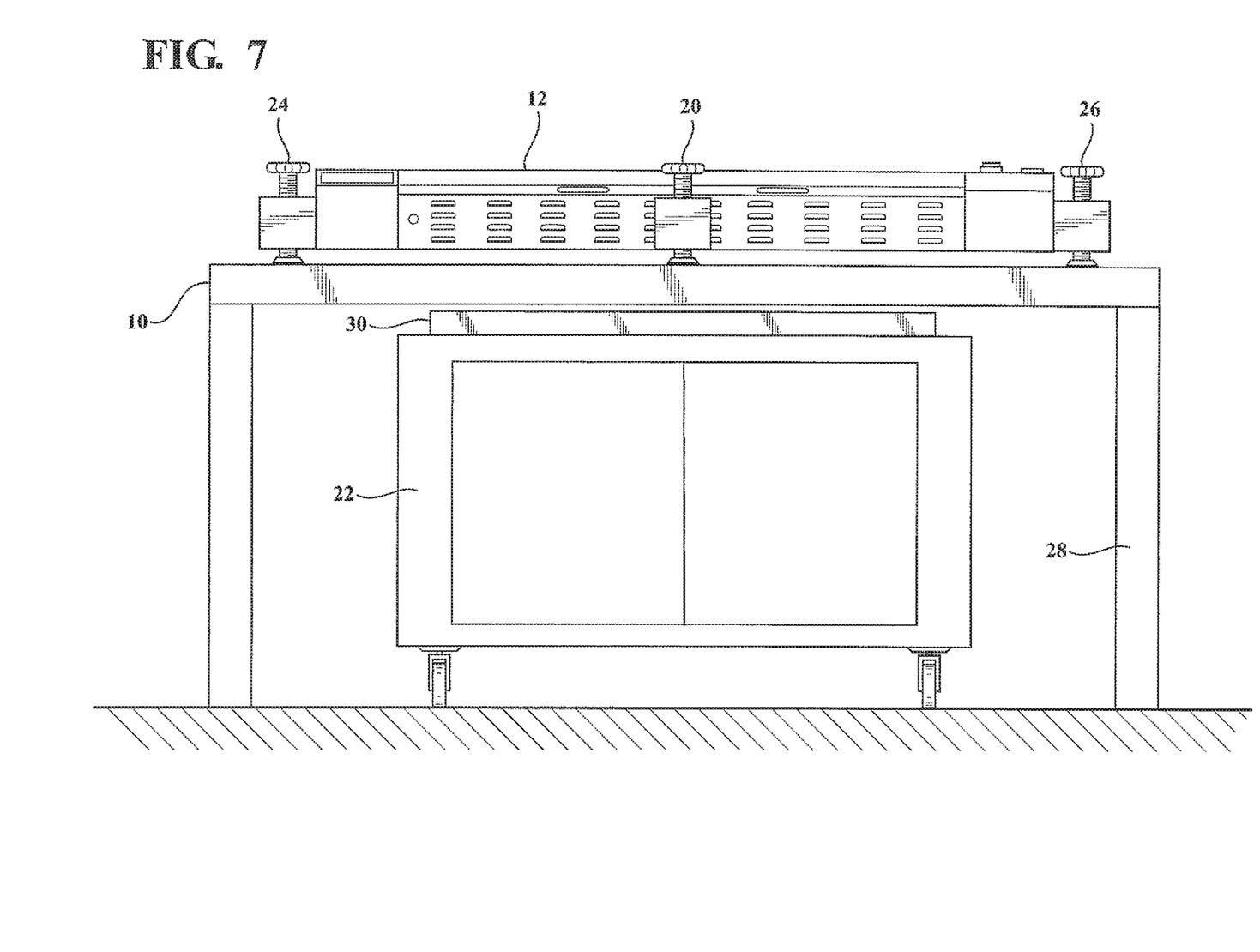
FIG. 7 is a front view the system of FIGS. 1 and 2 with the laser cabinet in a level condition to engrave upon a workpiece with a level top surface.

The cabinet 12 is mounted on the horizontal surface of the base table 10 so that the open bottom of the laser cabinet corresponds with the opening in the base table 10 thereby allowing the laser power beam from the nozzle 16 to intercept and operate on the top surface of a workpiece 30 which is resting on the top surface of the cart 22. The level of the cabinet 12 and, therefore, the working plane of the laser nozzle 16 in the x-y coordinate system is set by means of a front center support 20 and left and right rear corner adjustable supports 24 and 26 which include thumb wheel screws extending through fixtures mounted to the laser cabinet and resting on the top surface of the base table 10 as best shown in FIGS. 2 and 7.

Figures 3, 4:
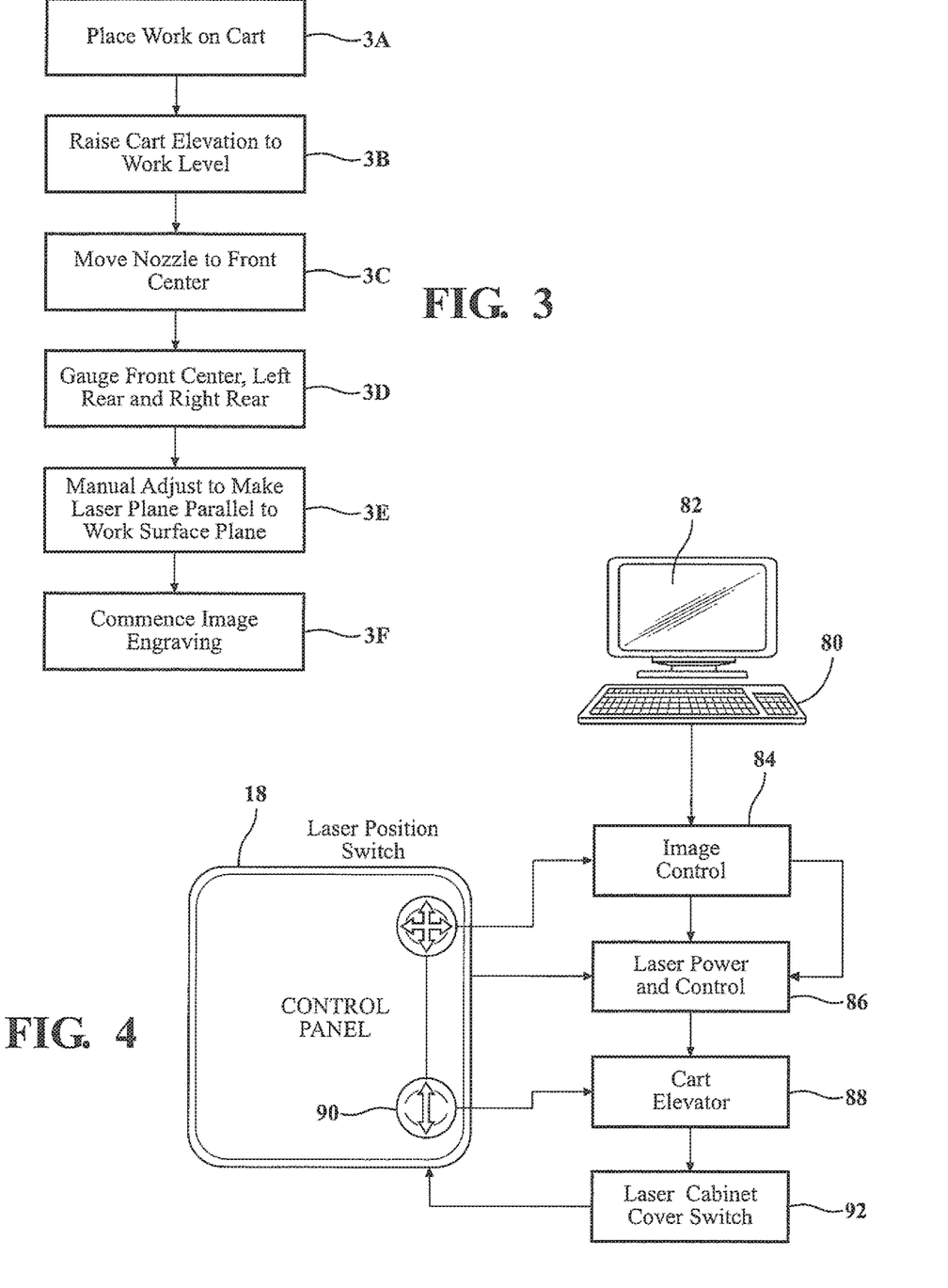
FIG. 3 is a flow chart of the steps of an engraving process which can be carried out by the apparatus of FIGS. 1 and 2.
FIG. 4 is diagrammatic view of the system of FIGS. 1 and 2 including the connections between a control panel and the various controlled elements of the engraving system.

In operation, the sequence of steps taken by the operator is schematically shown in FIG. 3. The top box 3A represents the step of placing the workpiece 30 on the top surface of the cart 22 and pushing the cart into the area between the legs 28 of the base table 10 so that the surface to be engraved is directly beneath the laser nozzle 16 and the area to be engraved coincides with the area through which the nozzle 16 can be moved in the x-y coordinate plane.

In the next lower box 3B, the step there to be performed by and through the control panel 20 is to operate an elevator system in the cart 22 to raise the target surface of the workpiece 30 until it is at or near the focal point of the laser nozzle 16 at the front center point adjacent the front adjustable support device 20.

Figures 2, 2A:
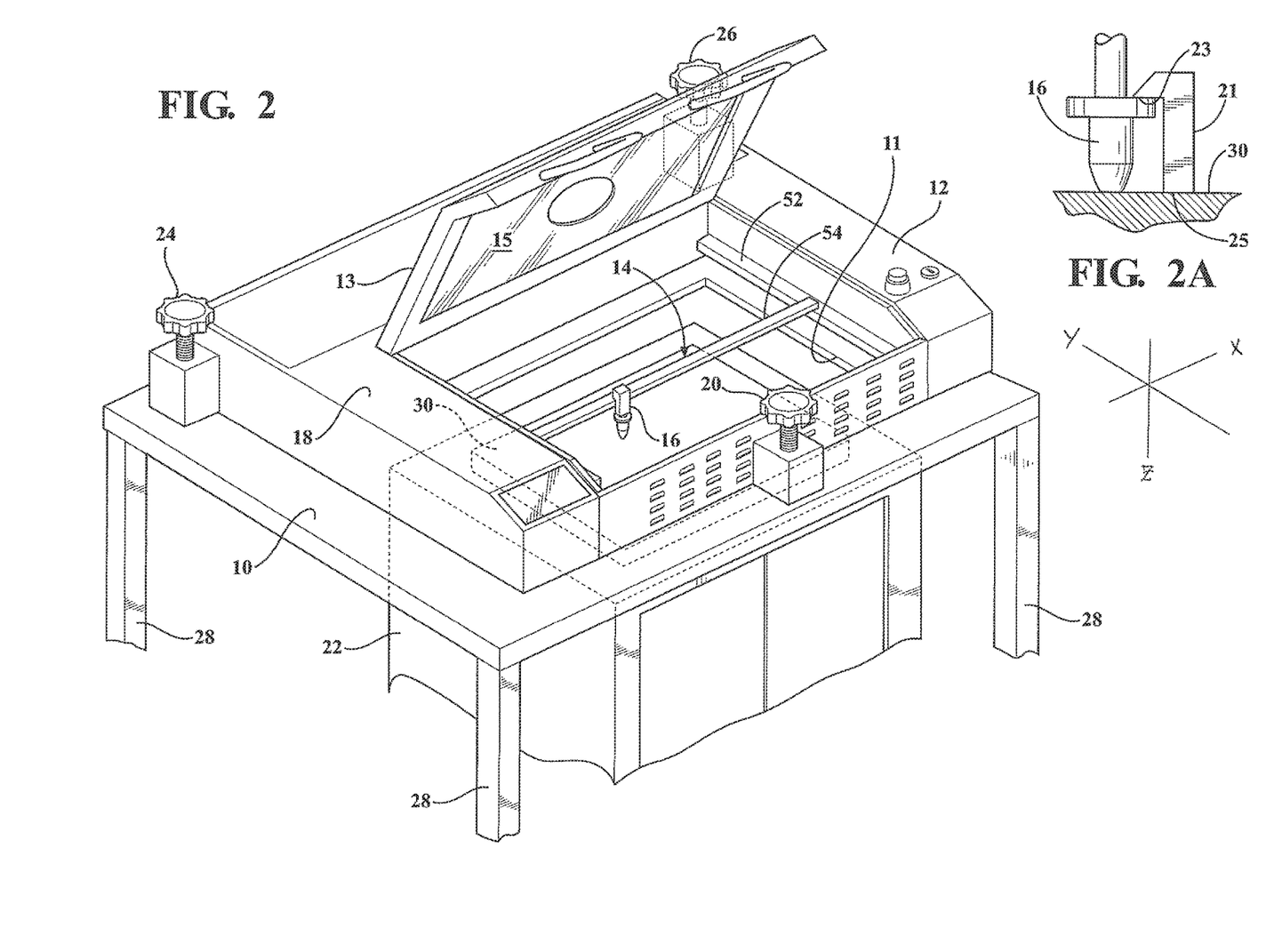
FIG. 2 is a three-quarter view of the system of FIG. 1 with the cover of the laser cabinet open.
FIG. 2A is a schematic drawing of a gauging device used to set the height of the laser nozzle relative to the target surface at one of the three suspension points.

As shown in the box 3C in FIG. 3, the laser nozzle is moved by way of the control panel 16 to a position immediately adjacent the adjustable mount 20 and the adjustable mount 20 is manually adjusted using a hand-held gauging device 21, shown in FIG. 2A, to place the target surface of the workpiece 30 at a distance from the nozzle 16 which corresponds exactly to the focal distance of the nozzle thereby ensuring maximum power transfer from the laser to the target surface to be engraved. This is of paramount importance since any significant deviation from the focal point results in a significant loss of transferred power.

The next step 3D is to individually operate the rear corner adjusters 24 and 26 and re-gauge the laser nozzle relative to the target surface of the workpiece 30 at the left and right rear corners to make sure that the operating plane of the laser nozzle 16 is at all locations in the working field at a constant distance from the target plane of the workpiece 30 or, to put it another way, to make sure that the operating plane of the laser in the x-y coordinates system is parallel to the target plane of the workpiece 30 also in the x-y coordinate system.

The final step 3E is shown in FIG. 3, is to commence and carry out the laser engraving operation in a known manner with the cover 13 of the laser cabinet closed and an exhaust fan connected to the exhaust conduit 46 in full operation.

As disclosed in my previously issued patent U.S. Pat. No. 8,309,881, the transport systems associated with the x axis transport beam 54 and the y axis transport beams 52 and 56, the laser nozzle can be moved in any pre-programmed pattern relative to the work surface or target surface of the workpiece 30 to carry out an engraving operation involving numbers, letters and images of virtually any kind. The typical transport system includes stepper motors, pullups, and cables as are well known in the art and need not be described in detail in this document.

As shown in FIG. 4, the control panel has dials and other control devices as well as a keyboard 80 associated with, for example, a laptop having a display screen 82 to program in the desired image or message to be engraved by way of the memory and control system 84. As will also be well understood by persons familiar with the operation of laser engraving, the power level of the laser may be programmed by control unit 86 to vary the effective depth of the laser beam to, for example, either cut all the way through the material of the workpiece or to remove material down to a certain level to expose the material of the workpiece which may or may not be colored by paint or other material. The cart elevator is controlled by unit 88, also programmable and controllable by switch 90 on the control panel 18. The laser cabinet is preferably provided with a safety switch associated with a hinge on the cover 13 to prevent the control panel from operating any of the units 84, 86 and 88 unless the cover 13 is fully closed.

Figure 8:
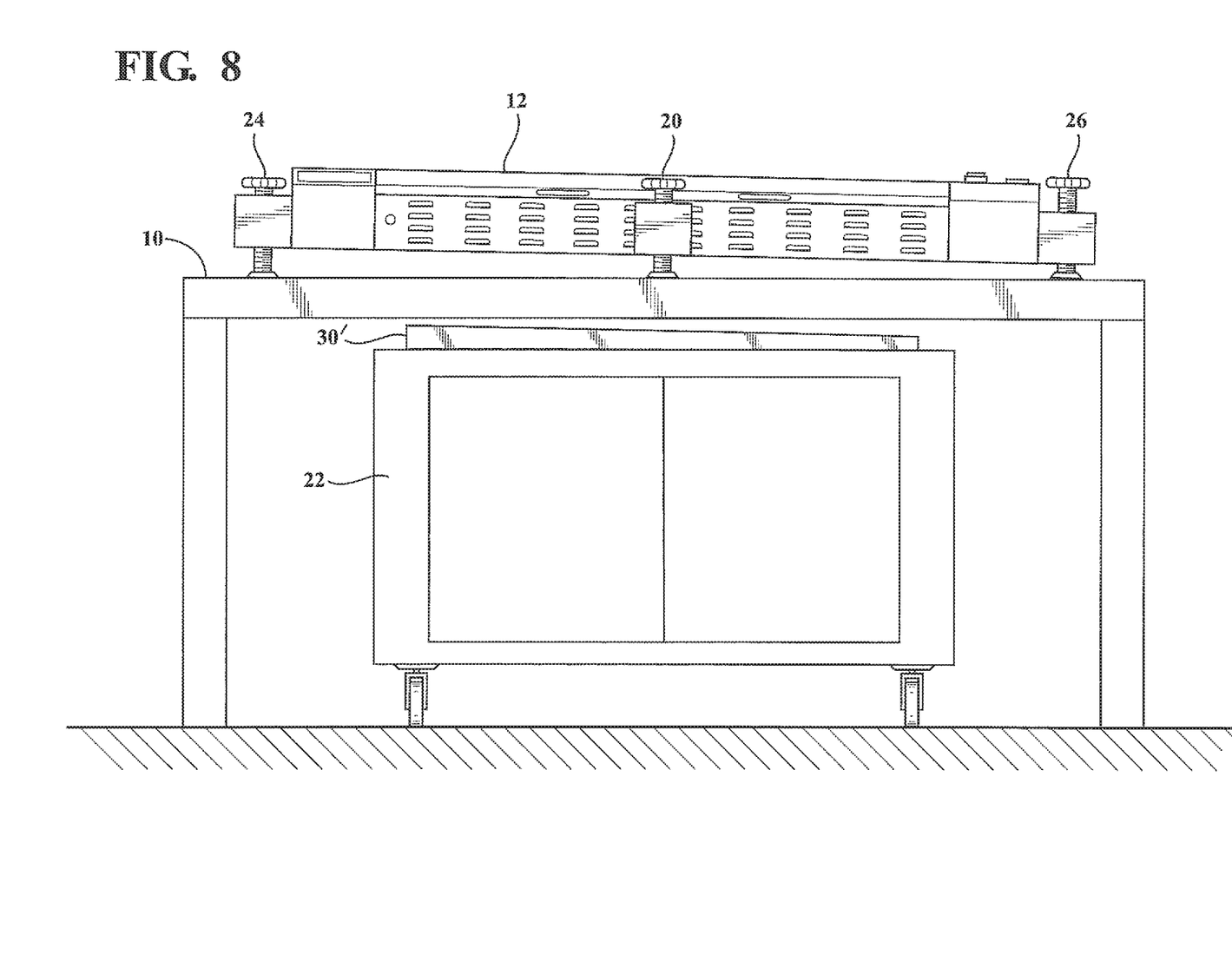
FIG. 8 is a front view of the system of FIGS. 1 and 2 with the laser cabinet adjusted to accommodate the target surface of a workpiece which is tilted.

As shown in FIG. 8 it is possible that the workpiece 30' is non-level relative to the top surface of the cart 22 in which case the adjusters 24 and 26 assume different levels thereby to tilt the cabinet 12 until the operating plane of the laser nozzle becomes parallel to the target surface of the workpiece 30; thus, ensuring a proper focal distance of the nozzle 16 from the target surface of the workpiece 30' at all relevant times.

Figure 5:
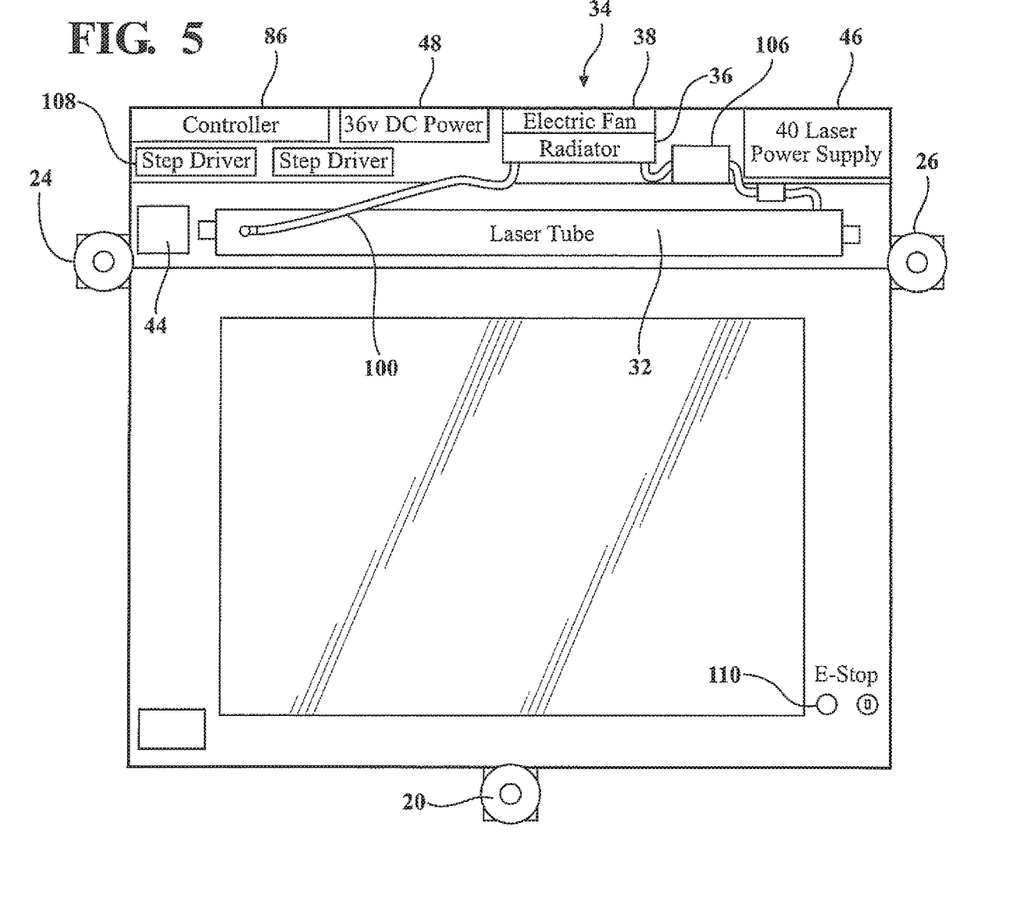
FIG. 5 is a top view of the apparatus of FIGS. 1 and 2 also showing in block diagram the various elements of the laser tube and the power supply and cooling system for it.
Figure 6:
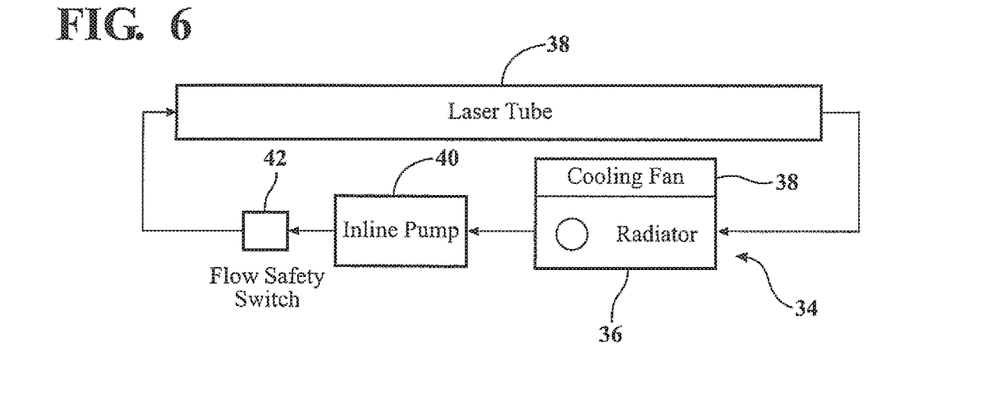
FIG. 6 is a schematic chart of the cooling system for a CO2 laser tube.

As shown in FIG. 6, the laser in this system is preferable a CO2 laser tube 32 which is approximately 36" in length and is stationed in an enclosure toward the rear of the cabinet as shown in FIG. 5. As will be apparent to persons skilled in the art, the laser tube is turned on and off and controlled as power level by unit 86 which is operated from the control panel 18 in a pre-programmed fashion. The laser tube 32 has a 40-watt power supply 46 and a cooling system including a coolant such as water which is circulated through tubes 100 to a radiator 36 having an electric cooling fan 38. I have found that it is not necessary to use an accumulator or tank for the water in my system as the radiator and the tube system, including a pump 106 have sufficient capacity to cool the laser tube 32.

As will also be understood by persons skilled in the art, the output of a CO2 laser tube is not in the visible spectrum. Therefore, it is desirable to provide a red laser 44 together with a combiner which joins and pre-aligns the non-visible output beam of the laser tube 32 with the red laser beam and directs the co-aligned beams through a mirror system to the nozzle 16 which is, as previously described, aimed along the z axis toward the surface of the workpiece to be engraved.

As indicated in FIG. 5 a step per driver 108 for the x-y coordinate drive systems is provided and emergency stop means 110 are provided to terminate the engraving operation in the event of a malfunction.

FIG. 6 shows the cooling system 34 for the laser tube 32 to include a radiator 36 with a cooling fan 38, and inline pump 40 and a flow responsive safety switch 42.

Reviewing, the laser cabinet 12 carrying the laser tube 32 and the system for directing a combined and invisible and visible beam to the z axis nozzle 16 is used to direct a variable power laser beam to the surface of the workpiece 30 or 30' mounted on the top surface of a cart 22 having an elevator system to raise the workpiece into the operating range of the laser system. The laser system is pre-programmed to cause the laser nozzle to move through a series of moves corresponding to the numbers, letters and/or overall image which is to be engraved on the workpiece surface.

The critical adjustment which places the laser nozzle at the correct distance for maximum controllable power transfer from the nozzle 16 to the target workpiece throughout the operating plane of the laser and over the entire target plane of the workpiece is made by first employing the front center adjuster 20 and the gauging device 21 to place the nozzle 16 at the front center position at the exact distance for maximum power transfer from the nozzle to the workpiece. The gauging device 21 is structured to engage a collar or flange on the nozzle 16 under the lip 23 while the bottom 25 of the gauging rest on the top surface of the workpiece. Knob on the adjuster 20 is turned until the gauging device makes perfect contact between the flange of the nozzle and the top surface of the workpiece.

The nozzle 16 is then moved to the left rear corner of the target surface and once again the gauge is used in combination with the adjuster 24 to achieve the correct distance between the nozzle and the target surface. The final step in the adjustment is to move the nozzle to the right rear corner of the target area and use the adjuster 26 in combination with the gauging device 21 to place the cabinet in the correct overall orientation to accommodate any tilt in the x-y plane of the target surface relative to the support surface of the cart. Thus, the working plane of the nozzle 16 is effectively parallel to the target surface of the workpiece 30 or 30' regardless of its horizontality in space.

Figure 9:
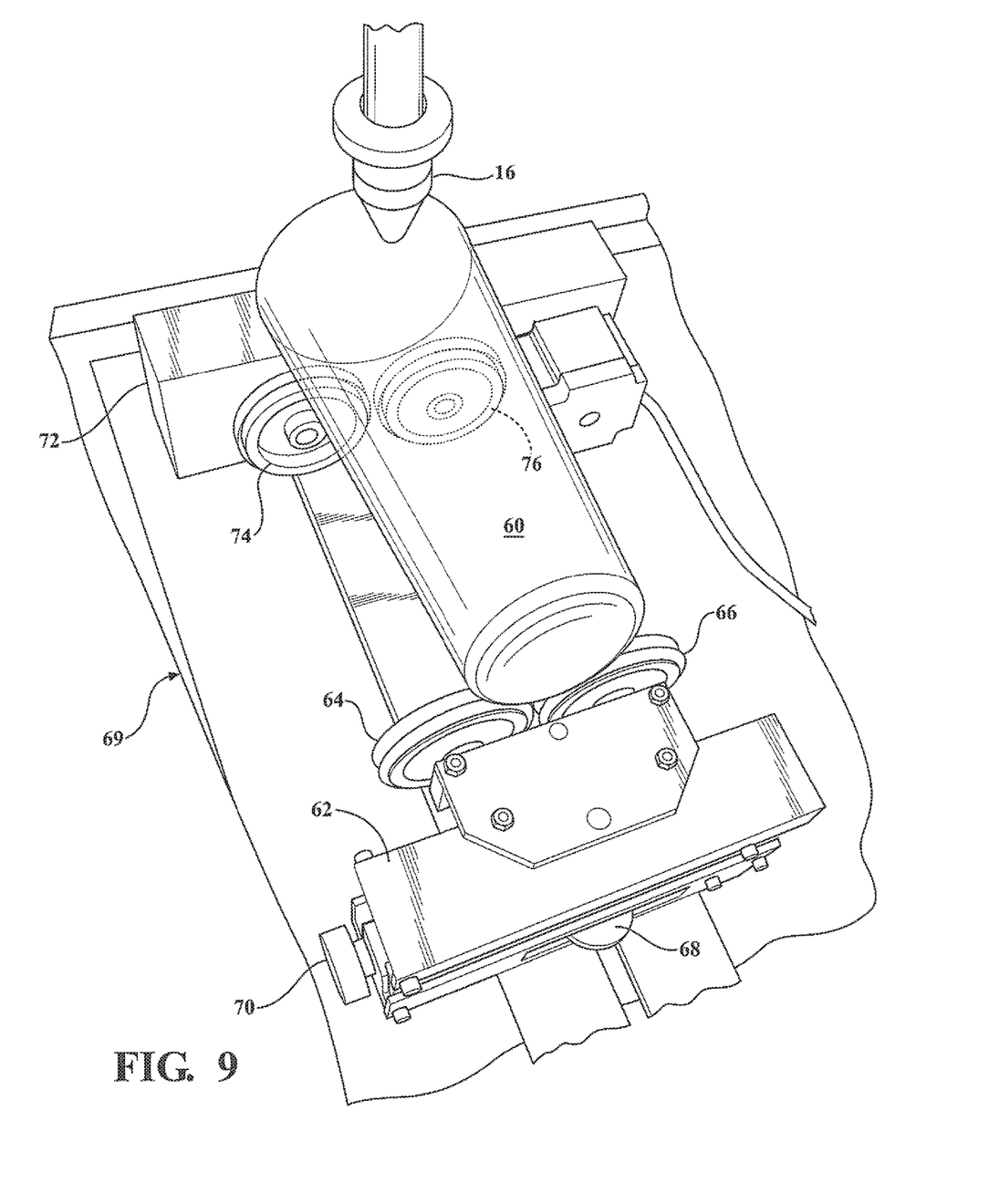
FIG. 9 is a perspective view of an add-on device for performing an engraving process on a tapered cylindrical object.

Referring now to FIG. 9, there is shown a device which may be placed on the top surface of the cart 22 to receive a cylindrical or tapered cylindrical article 60 to be engraved by the beam from the nozzle 16. The device comprises a frame 69 having a first block 62 with rotatable cushioned wheels 64 and 66 that may be elevated and/or moved in the x-y plane by adjusters 68 and 70.

In parallel to the wheel 64 and 66 is a second block 72 carrying rotatable idler wheels 74 and 76 which are cushioned with rubber peripheral bands along with the wheels 64 and 66. The article 60 is placed on the wheels and one of the wheels 64 and 66 is driven by means of a motor in the block 62 to rotate the device 60 during an engraving operation as power is supplied to the laser causing a beam to be omitted from the nozzle 16 during rotation of the device 60.

It will be understood by persons skilled in the art that various ways of operating or using the system thus far described are possible. As a first example, the cart 22 may take various forms. Although shown in the drawing as a cabinet type cart with wheels having a substantial and permanent construction, the cart may be made portable and foldable for smaller laser engraving systems and to facilitate storage.

As a second significant departure from the system described above, it will be apparent to those skilled in the art that the laser cabinet 12 and laser system carried by it may be place directly on a large area workpiece or on the floor without use of the intervening base table 10. Again, the gauging and adjusting system 20, 21, 24 and 26 is used in the manner described to ensure that the operating plane of the laser nozzle in the x-y coordinate system is at all time parallel to the surface to be engraved there by to ensure maximum power transfer from the laser tube 32 through the mirror system to the nozzle 16 and from there to the surface of the article to be engraved.

Further and additional additions and modifications to the illustrative embodiment described herein, will occur to persons skilled in the art to accommodate various and sundry operations situations and conditions.

Figure 1:
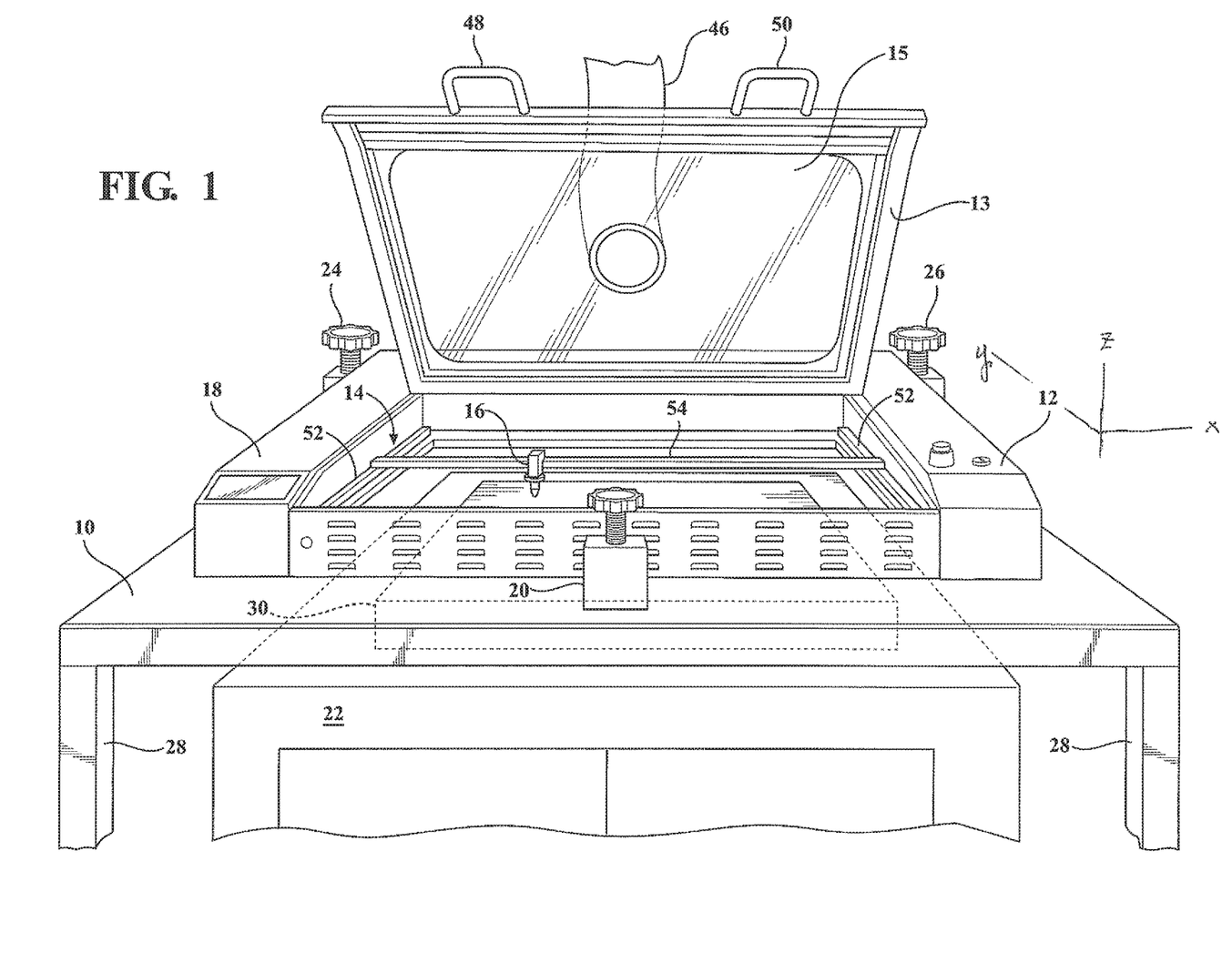
FIG. 1 is a front perspective view of a laser engraving system located on a support table above a workpiece which in turn is carried by a push-in cart located immediately under the open area of the support table.
Figure 10:
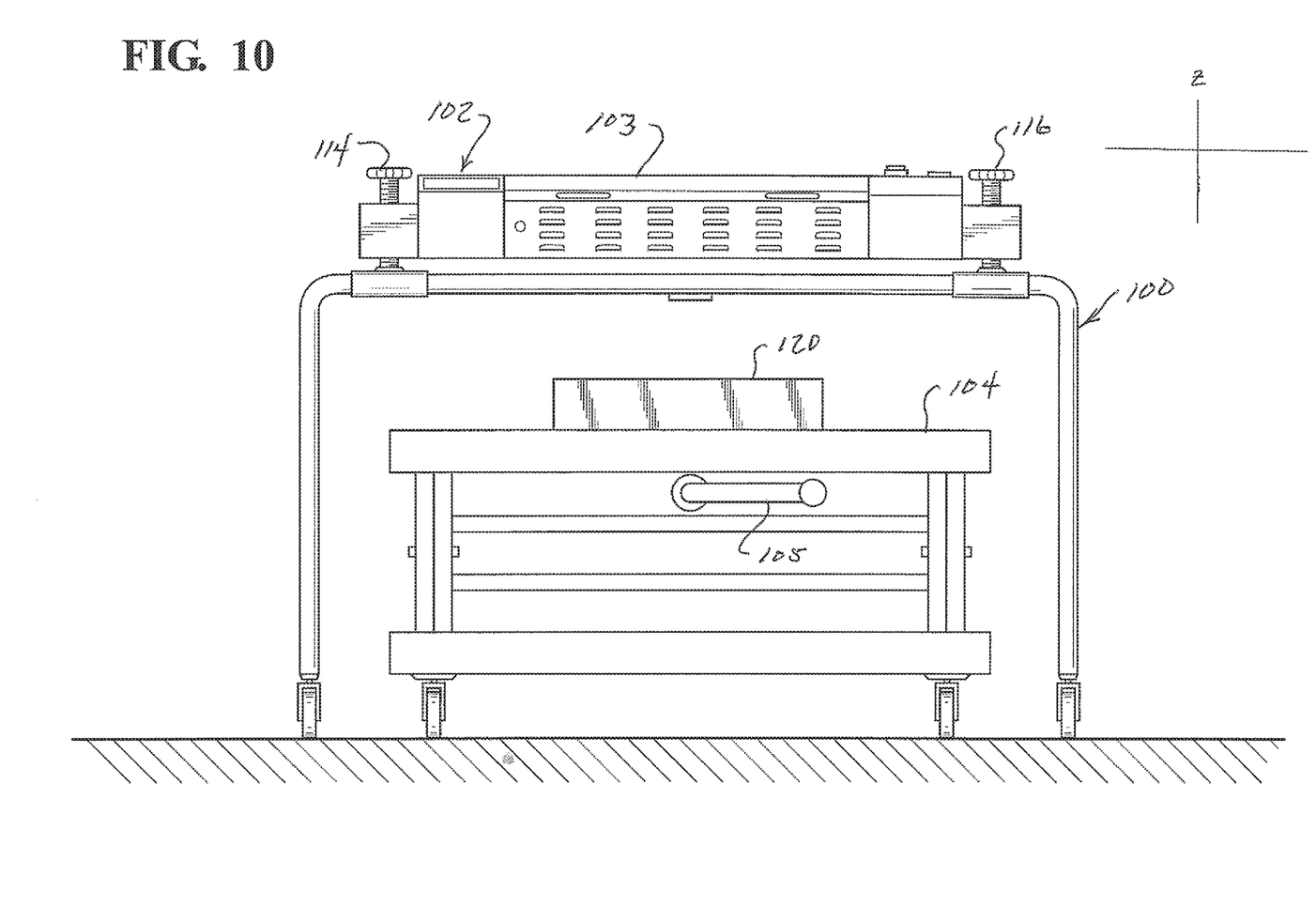
FIG. 10 is a front view of a portable laser engraving system using a foldable table.
Figure 11:
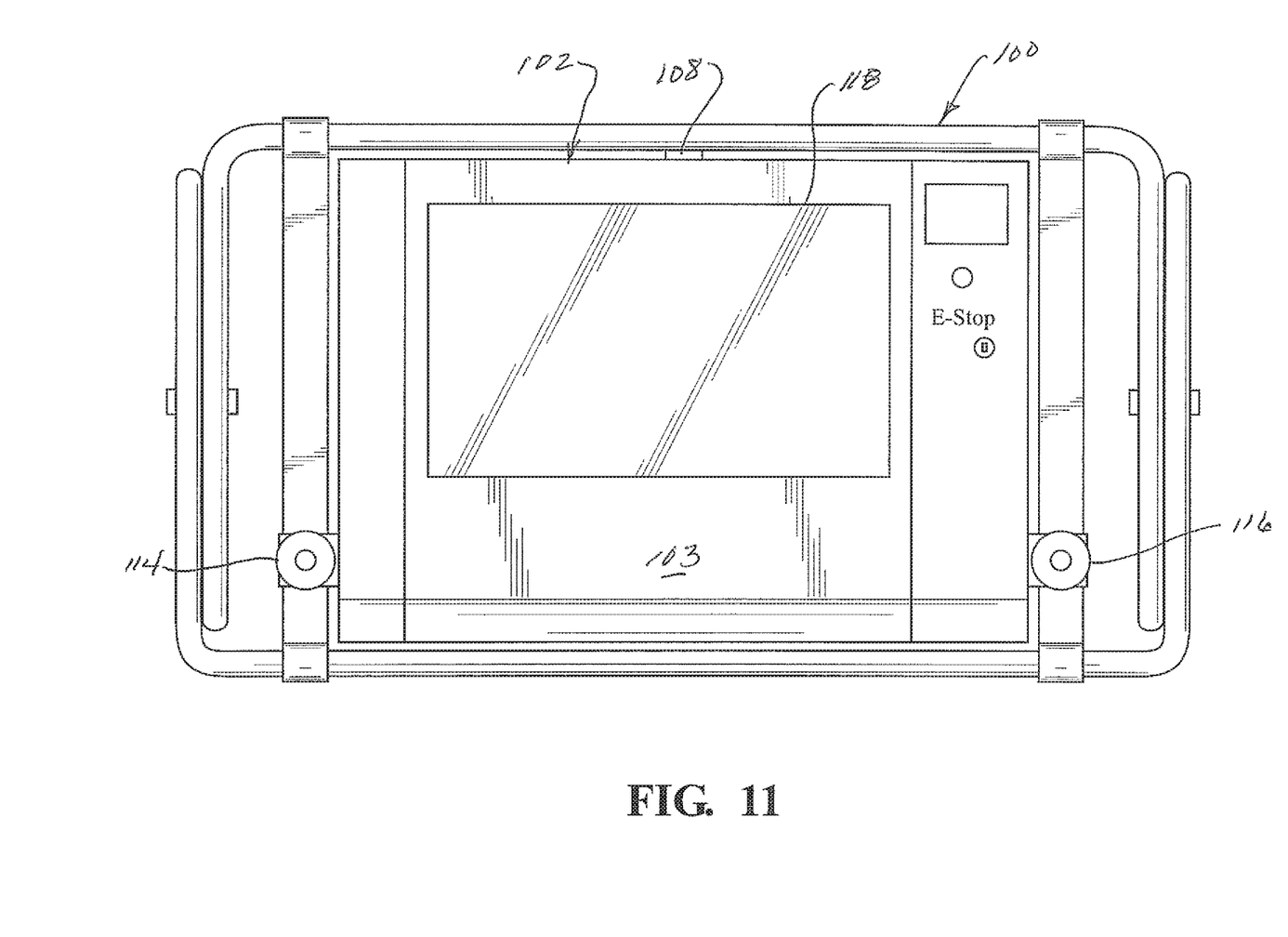
FIG. 11 is a top view of the portable engraving system of FIG. 10.
Figure 12:
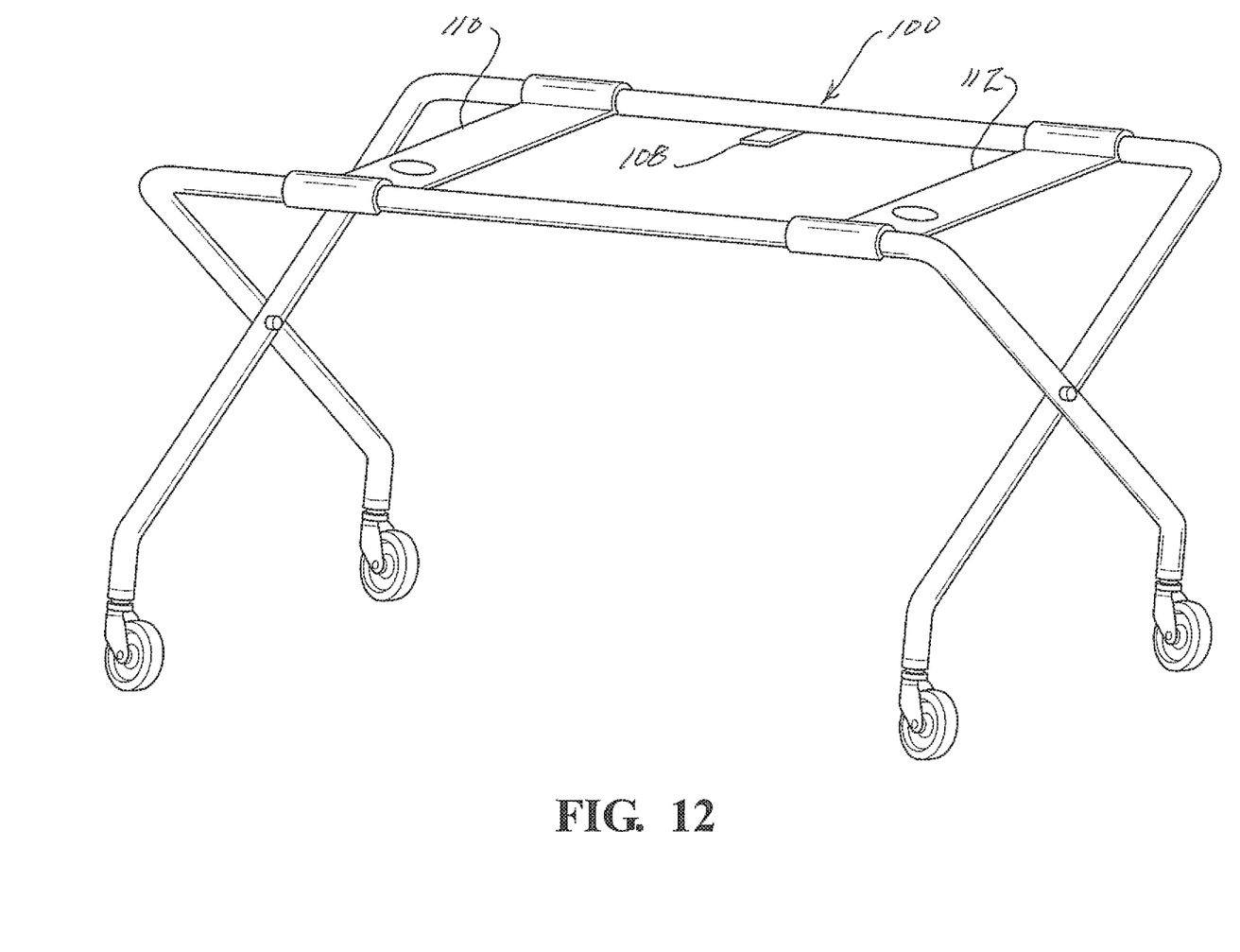
FIG. 12 is a perspective view of a foldable table used in the embodiments in FIGS. 10 and 11.

Referring now FIGS. 10-12 there is shown a smaller "portable" engraving system including a cabinet 102 for a laser engraving system that includes a laser tube beam generator, and optical system and a z axis pointed nozzle in much the same manner as is described with respect to the embodiment of FIG. 1 but on a smaller scale. As a result, those details are not repeated here except to show that the cabinet 102 incorporates a hinged cover 103 with a viewing window 118 that is essentially coextensive with the engraving field so that the operator can observe the engraving process.

The system of FIGS. 10-12 further includes a table 100 in the form of a foldable tubular frame structure having support members 108, 110 and 112 to accommodate the cabinet 102 of the laser engraving system. The member 108 is a fixed pad welded to the center rear tube of the table and the cabinet 102 of the laser engraver rests firmly thereon, as shown in FIG. 11. The elongate members 110 and 112 between the front and rear tubes of the table 100 also accommodate the laser cabinet and in particular provide resting points for the feet of the turn screw adjustable supports 114, 116 mounted on the front left and right corners of the cabinet 102. Together the elements 108, 114 and 116 provide a three-point support/suspension system that allows the elevation and orientation of the laser cabinet 102 and the laser nozzle therein to be adjusted so that the laser nozzle travels through a working plane that is parallel to the working surface of the workpiece 120 resting on the top of the wheeled cart 104. The cart 104 fits into and between the legs of the fold-up table 100 as shown in FIG. 10. Note that the cart 104 has a manually operated crank elevator with an appropriate gears and other necessary mechanisms to allow the support surface of the cart to be raised and lowered relative to the cabinet 102 of the engraving system. Both cart 104 and table 100 have caster type wheels. Hand crank lever 105 operates the elevator.

In the system of FIGS. 10-12 the adjustment of the elevation of the working surface relative to the laser nozzle within the engraving cabinet 102 is carried out by the elevator in the cart 104; i.e. there is no adjustable feature to the support 108 which is provided by the center rear pad on the table 100, thus simplifying the structure and the operation thereof. Once that elevation has been achieved to place the laser nozzle at the proper focal distance from the surface of the workpiece to be engraved, then the thumb wheel screws 114 and 116 are adjusted as necessary to finish the process of elevating and orienting the cabinet 102 and the working plane of the laser nozzle therein so that it is parallel to the working surface of workpiece to be engraved at all times during an engraving process.

The embodiment of FIGS. 10-12 illustrates the fact that the three-point suspension system, although it remains triangular in geometry, can have one of the support points as a fixed support and rely on the elevator in the cart to place the nozzle at the proper focal distance from the workpiece while the other two supports, in this case 114 and 116, remain adjustable to provide not only elevation adjustments but tilt or orientation adjustments as well. The embodiment also shows that the fixed support 108 can be in the center rear rather than in the center front as is the case with respect to the embodiment of FIG. 1. The gauging device shown in FIG. 2A is used with the portable system in the same way as it is used in the system of FIGS. 1-9.

What is claimed is:

1. An engraving device comprising:
   a cabinet defining an xyz coordinate system, said cabinet having an open bottom;
   an engraving tool mounted within the cabinet and operable through said open bottom for programmable translation through an xy axis field to perform an engraving operation on a workpiece; and
   a three-point, triangular suspension system for establishing the elevation and orientation of the cabinet relative to a work surface wherein at least two of the points of the suspension system are adjustable and located proximate opposite rear corners of the cabinet, and the third suspension point is proximate the front center of the cabinet.

2. The device defined in claim 1 wherein the tool is a laser aimed along the z axis.

3. The engraving device as defined in claim 1 wherein the suspension third point is fixed.

4. A device as defined in claim 2 further including a support table for the cabinet, said table having an opening corresponding essentially to the geometry of and co-located vertically with the xy translation field of the engraving tool.

5. A device as defined in claim 3 further including a cart placed below the cabinet and adapted to carry a workpiece on which the engraving tool can operate, said cart having an elevator system for moving the workpiece along the z axis and relative to the cabinet.

6. A device as defined in claim 2 wherein the cabinet has a hinged cover with a viewing window substantially coextensive with the xy translation field of said tool.

7. A laser engraving system as defined in claim 2 further comprising:
   A base table for supporting the laser engraving cabinet containing a programmable laser a laser beam nozzle aimed along a z axis through said open bottom and a control system for moving the laser nozzle in a working plane having x and y axes in the same coordinate system as the z axis; and
   a workpiece support device for placing a workpiece defining a target plane beneath the laser beam nozzle.

8. The engraving system as defined in claim 5 wherein the table is a rigid structure having legs and top horizontal surface areas for supporting said laser cabinet, said table being open to allow direction of a beam from said laser nozzle along the z axis toward the surface of a said workpiece in said working plane.

9. An engraving system as defined in claim 5 wherein said cabinet contains a cooling system for said laser, a lateral support disposed along and parallel to said x axis, means for causing programmed movement of said laser nozzle along said beam, a support structure for translating said lateral support along x and y axes, and means for programably moving the beam along said y axis during an engraving operation.

10. A laser engraving system as defined in claim 2 wherein each of said adjustable support points comprises a screw shaft.

11. A laser engraving system as defined in claim 5 wherein the workpiece support device is a cart moveable relative to the base table and includes an elevator system within said cart for raising and lowering a workpiece relative to the horizontal support surface of said table and said laser system.

12. A laser engraving system as defined in claim 2 further including means disposable on said workpiece support device for receiving a rotatable workpiece having an axis of symmetry parallel to the x axis wherein said device is capable of rotating the workpiece about its own axis of symmetry during an engraving operation.

13. A laser system for engraving patterns and images on a planar workpiece surface comprising:
   a cabinet having an open bottom carrying a laser tube, a beam nozzle aimed through the open bottom of the cabinet and an optical system for coupling an output from the laser tube to the nozzle;
   means for translating the nozzle throughout at least a portion of an x-y plane; and
   means for adjusting the orientation and elevation of the cabinet relative to said surface until the x-y plane is parallel to the plane of said surface wherein said means comprises a triangularly arranged 3-point suspension wherein at least two of the suspension points are adjustable along a z-axis.

* * * * *